May 3, 1966     E. L. BAKKE     3,249,220
GRAIN AUGER AND CLEANER
Filed June 13, 1963     2 Sheets-Sheet 1
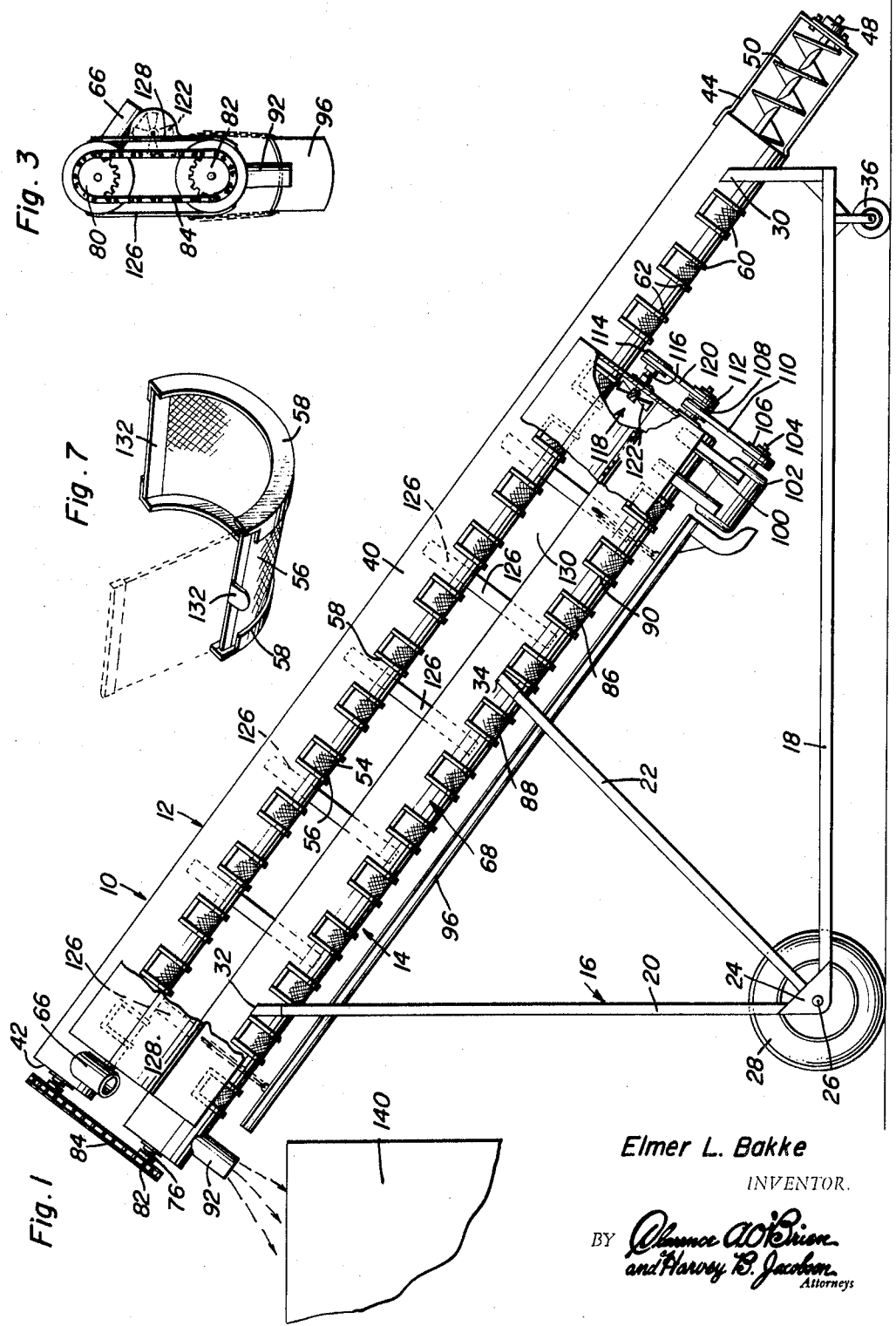
Elmer L. Bakke
INVENTOR.

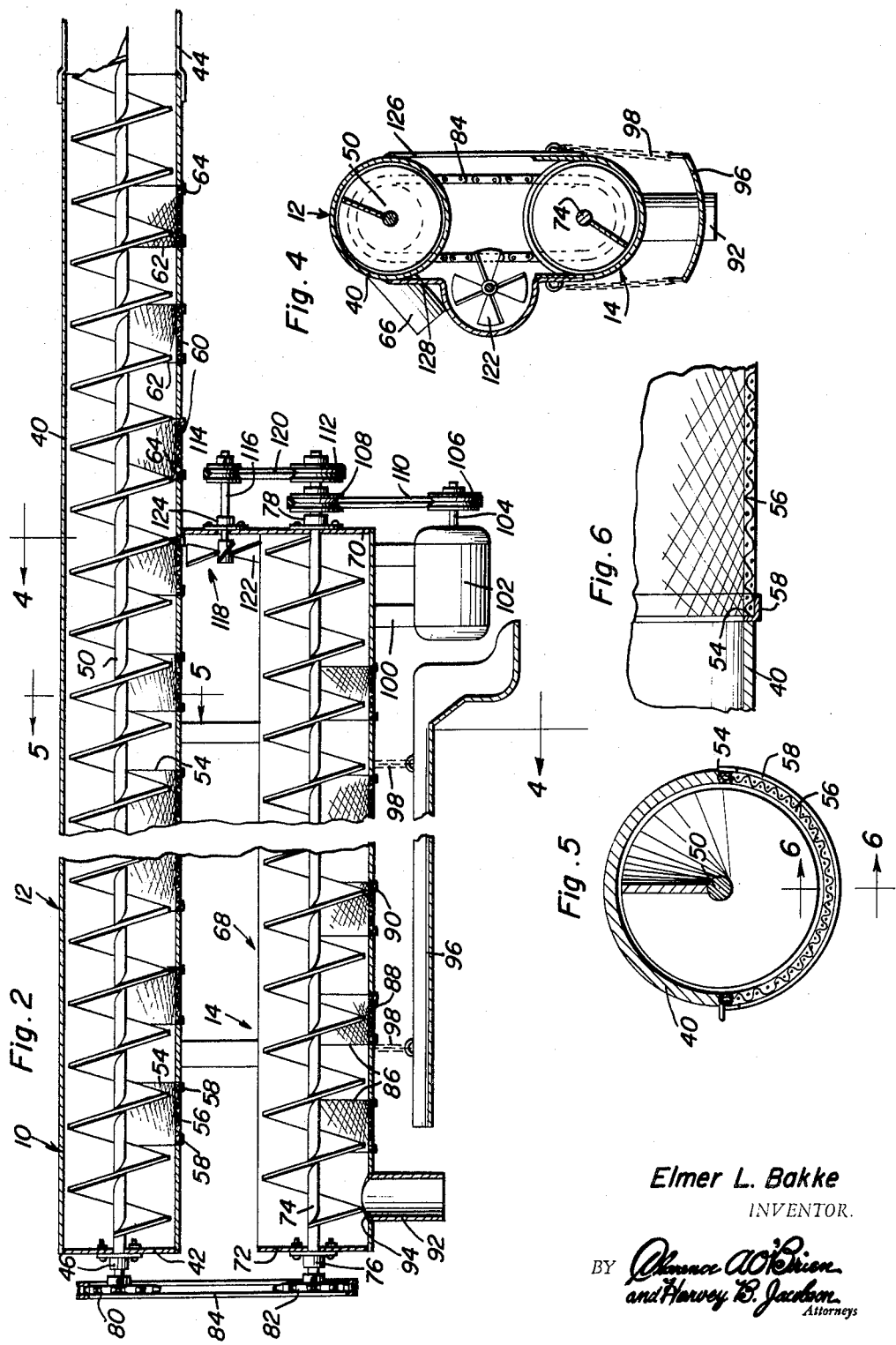
May 3, 1966     E. L. BAKKE     3,249,220
GRAIN AUGER AND CLEANER
Filed June 13, 1963     2 Sheets-Sheet 2
Elmer L. Bakke
INVENTOR.

United States Patent Office 3,249,220
Patented May 3, 1966

3,249,220
GRAIN AUGER AND CLEANER
Elmer L. Bakke, Kensal, N. Dak.
Filed June 13, 1963, Ser. No. 287,589
4 Claims. (Cl. 209—33)

This invention relates to a novel and useful grain auger and more specifically to a grain auger constructed in a manner whereby it may be utilized to clean the grain being handled thereby as the grain is being lifted by means of the auger.

The main object of this invention is to provide a new and effective and durable grain elevating auger.

Another object of this invention is to provide a grain auger constructed in accordance with the immediately preceding object which will be capable of separating both large and small weed seeds from the grain being elevated by means of the auger.

Still another object of this invention is to provide a grain auger including means by which lighter particles may be separated from the grain being handled by the auger independently of the size of the lighter particles.

A still further object of this invention is to provide a grain auger constructed in a manner enabling the large and small weed seeds and the lighter particles to be separated from the grain while the auger is elevating the grain.

A final object of this invention to be specifically enumerated herein is to provide a useful and portable grain elevating auger which may be readily transported from one location to another.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the grain auger and cleaner of the instant invention;

FIGURE 2 is an enlarged fragmentary longitudinal vertical sectional view of the embodiment illustrated in FIGURE 1 taken substantially upon the plane passing through the longitudinal centerline of the grain auger;

FIGURE 3 is an end elevational view of the grain auger and cleaner as seen from the upper left hand side of FIGURE 1;

FIGURE 4 is a sectional view taken substantially upon the plane indicated by the section line 4—4 of FIGURE 2;

FIGURE 5 is an enlarged fragmentary sectional view taken substantially upon the plane indicated by the section line 5—5 of FIGURE 2;

FIGURE 6 is an enlarged fragmentary longitudinal vertical sectional view taken substantially upon the plane indicated by the section line 6—6 of FIGURE 5; and FIGURE 7 is a perspective view of one of the sieve members of the instant invention.

Referring now more specifically to the drawings the numeral 10 generally designates the grain auger of the instant invention which may be seen in FIGURE 1 to include a first auger assembly generally referred to by the reference numeral 12 and a second auger assembly generally referred to by the reference numeral 14. While the second auger assembly 14 performs an important function, its presence is not required and therefore some of the main advantages of the instant invention may be realized merely by using the auger assembly 12.

The grain auger includes a wheeled supporting structure generally referred to by the reference numeral 16 comprising a pair of horizontal legs 18, a pair of vertical legs 20 and a pair of inclined legs 22. Corresponding ends of the legs 18, 20 and 22 are secured together by means of corner brackets 24 and an axle 26 is rotatably journaled between the corner brackets 24 and supports a pair of ground-engaging wheels 28. The ends of the legs 18 remote from the corner brackets 24 are secured to the auger assembly 12 as at 30 while the free ends of the legs 20 and 22 are secured to the auger assembly 14 as at 32 and 34 respectively. In addition, the ends of the legs 18 remote from the corner brackets 24 are provided with small depending supporting wheel assemblies 36.

The auger assembly 12 comprises an elongated generally cylindrical housing 40 including an end wall 42 on one end. The other end of the housing 40 is provided with a bracket assembly 44 and the end wall 42 and the bracket assembly 44 include aligned bearing assemblies 46 and 48 respectively which rotatably journal the opposite end portions of an elongated auger screw member 50. The auger screw member 50 is snugly cradled in and extends longitudinally of the lower portion of the cylindrical housing 40 which defines the bottom wall thereof and it may be seen that the bottom wall is provided with a plurality of openings 54 which are spaced longitudinally thereof and extend approximately one-half the distance about the circumference of the housing 40.

Sieve means in the form of arcuate screening sections 56 are provided and are removably secured in the openings 54 by means of L-shaped brackets 58. It will be noted that the screening sections 56 conform to the shape of and define continuations of the adjacent portions of the bottom wall of the housing 40. In addition to the screening sections 56, three screening sections 60 which are similar to but finer than the screening sections 56 are secured in the lower three openings 62 formed in the bottom wall of the housing 40. L-shaped brackets 64 which are similar to the L-shaped brackets 58 are utilized for removably securing the screening sections 60 in the openings 62.

The housing 40 is provided with a downwardly and outwardly inclined outlet neck 66 at its upper end whose purpose will be hereinafter more fully set forth and it is to be understood that the lower end of the auger screw member 50 projects outwardly of the lower end of the housing 40 in order that the grain auger 10 may be advanced upon a pile of grain.

The auger assembly 14 is similar in many respects to the auger assembly 12 and also includes a housing generally referred to by the reference numeral 68 but which is generally U-shaped in cross section and open along its top. The housing 68 is of a length to underlie the upper-portion of the housing 40 in which the openings 54 are formed. In this manner, the lower portion of the housing 40 having the openings 62 formed therein projects beyond the corresponding end of the housing 68. The housing 68 includes an end wall 70 which interconnects the housings 40 and 68 and also an upper end wall 72. An auger screw member 74 is provided and is rotatably journaled from the bearings 76 and 78 supported from the end walls 72 and 70 respectively. The upper ends of the auger screw members 50 and 74 are provided with sprocket wheels 80 and 82 respectively and are drivingly connected by means of an endless chain 84 entrained about the sprocket wheels 80 and 82.

The housing 68 also has openings referred to by the reference numeral 86 formed in the lower portion thereof and spaced longitudinally therealong in which sieve means in the form of screening sections 88 are removably secured by means of the L-shaped brackets 90 which are similar to the L-shaped brackets 58.

An outlet neck 92 is secured in an opening 94 formed in the upper end of the housing 68 and a concave trough 96 is supported from and beneath the housing 68 in registry with the openings 86 by means of flexible chains 98. In addition, a motor mounting frame 100 is dependingly supported from the housing 68 and supports an electric motor 102 having an output shaft 104 on which a pulley 106 is secured. The pulley 106 is aligned with a driven pulley 108 connected to the bottom of the auger screw member 74 and is drivingly connected to the driving pulley 106 by means of an endless belt member 110. In addition, a driving pulley 112 is mounted on the auger screw member 74 below the pulley 108 and is drivingly connected to a driven pulley 114 secured to the input shaft 116 of a blower assembly generally referred to by the reference numeral 118 by means of an endless flexible belt 120. The blower assembly 118 comprises the input shaft 116 and a blower member 122 mounted on the shaft 116 inwardly of the end wall 70, the input shaft 16 being rotatably supported by means of a bearing 124 supported on the end wall 70.

The housing 68 is supported from the housing 40 by means of a plurality of strap members 126 connected between one pair of corresponding sides of the housings 40 and 68 and a panel-like brace 128 secured between the other pair of corresponding sides of the housing 40 and 68.

The area defined between the housings 40 and 68 forms a tunnel or passage 130 through which the grain being discharged through the screening sections 56 must pass when falling into the upwardly opening housing 68.

From FIGURE 7 of the drawings it may be seen that the opposite ends of the screening sections 56 are provided with sealing members 132 and it is to be understood that the other screening sections 60 and 88 are similarly constructed.

In operation, as the grain auger 10 is advanced upon a pile of grain, the screw member 50 will raise the grain up into the lower end of the housing 40.

As the grain is pulled into the lower end of the housing 40, it passes over the screening sections 60 and it is to be understood that the screening sections 60 are considered to be fine so as to allow only those weed seeds smaller than the grain being handled by the grain auger 10 to pass outwardly through the screening sections 60. The grain and larger weed seeds are therefore carried further upwardly in the housing 40.

As the mixture of grain and larger weed seeds move upwardly through that portion of the housing 40 disposed above the housing 68, the grain falls through the coarser screening sections 56 and transversely of the tunnel or passage 130 and into the upwardly opening housing 68. The screening sections 56 are coarser than the sections 60 but are fine enough to retain the larger weed seeds within the housing 40. These larger weed seeds travel upwardly through the housing 40 and outwardly of the outlet neck 66 from which point they may be collected.

As the grain falls through the sections 56 in the housing 40 and into housing 68, an air blast from the blower assembly 118 passing through the tunnel 130 blows the light material from the falling grain and out between the strap members 126.

The screening sections 88 are comparable to the screening sections 60 and therefore are designed to allow the smaller weed seeds to fall therethrough while retaining the grain within the housing 68. As the grain within the housing 68 is elevated to the upper end thereof, it is discharged through the neck 92 and into the receptacle 140 which is provided for the purpose of collecting the desired grain.

The finer weed seed discharged from the screening sections 88 falls downwardly upon the trough 96 and slides down to the lower end of the latter wherein further receptacle means may be provided for collecting this weed seed so that it may not be inadvertently mixed with the grain pile upon which the grain auger 10 is being advanced.

As hereinbefore pointed out, the housing 68 is not absolutely required and an acceptable job of separating and cleaning of the grain may be accomplished by the auger assembly 12 without also using the auger assembly 14. However, a higher grade of grain may be achieved by the use of the second auger assembly 14 in order to further reduce the percentage of small weed seeds therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A grain auger comprising a first elongated screw-type auger assembly including an inclined auger housing having a generally semi-cylindrical bottom wall and an elongated auger screw member journaled therefrom for rotation about its longitudinal axis and snugly cradled in and extending longitudinally of said bottom wall, said bottom wall having openings formed therein and spaced longitudinally there along, sieve means disposed across said openings generally conforming to the shape of and forming continuations of the adjacent portions of said bottom wall, the lower sieve means disposed adjacent the lower end of said assembly being finer than the upper sieve means disposed thereabove, said finer sieve means being of a size adapted to pass therethrough the smaller weed seed mixed with the grain seed being handled by said assembly and to prevent passage of said grain therethrough, said upper sieve means being of a size adapted to pass said grain therethrough and to prevent passage of the weed seed larger than said grain therethrough, upwardly opening and elongated trough means generally paralleling and dependingly supported from said housing in vertically spaced relation thereto and adapted to receive said grain after it passes through said upper sieve means, said trough means comprising the elongated inclined housing of a second auger assembly having a second auger screw member journaled and snugly cradled therein and also provided with openings spaced longitudinally along the lower portion of said trough, sieve means disposed across said trough openings generally conforming to the shape of and forming continuations of the adjacent portions of said trough housing, said trough sieve means being of a size adapted to pass therethrough any small weed seed remaining mixed with said grain and having its lower end spaced above said lower sieve means, of said first auger assembly, the spacing between the first and second mentioned auger assemblies defining an elongated vertically extending seed free falling area generally paralleling and disposed between said assemblies and open on at least one side, a blower assembly supported adjacent the lower end of said area above a transverse plane disposed generally normal to the longitudinal centerlines of said housings and passing through the uppermost lower sieve means, said blower assembly being operative to direct air upwardly longitudinally through said area whereby lighter material mixed with said grain being discharged through said upper sieve means and falling through said area will be blown upwardly through and longitudinally of said area and laterally outwardly of at least said one side of said area and thereby be separated from said grain, and grain discharge means defined by the upper end of said trough means adapted to discharge therefrom the grain lifted to the upper end portion of said trough means.

2. The combination of claim 1 wherein said first and second auger assemblies include means removably supporting the corresponding sieve means therefrom.

3. The combination of claim 1 including second elongated trough means dependingly supported from said second screw auger assembly adapted to receive said weed seed after it passes through the sieve means of the second assembly.

4. The combination of claim 1 including motor means drivingly connected to said auger screw members and said blower assembly, said motor means comprising a single motor.

References Cited by the Examiner

UNITED STATES PATENTS

| | | | |
|---|---|---|---|
| 319,809 | 6/1885 | Gathmann | 209—283 |
| 458,469 | 8/1891 | Loger | 209—32 |
| 546,749 | 9/1895 | Urie | 209—283 |
| 945,187 | 1/1910 | Nelson | 209—283 |
| 1,781,472 | 11/1930 | Nagle | 209—283 |
| 2,706,046 | 4/1955 | Andrews | 209—283 |
| 2,877,900 | 3/1959 | Kinderknecht | 209—283 |

HARRY B. THORNTON, *Primary Examiner.*

R. HALPER, *Assistant Examiner.*